United States Patent [19]

Inaba et al.

[11] Patent Number: 4,850,684
[45] Date of Patent: Jul. 25, 1989

[54] ELECTROCHROMIC DISPLAY DEVICE

[75] Inventors: Hiroshi Inaba, Matsusaka; Kiyoshi Nakase, Mie; Yukitoshi Yanagida, Matsusaka; Hiroyuki Nishii, Ise, all of Japan

[73] Assignee: Central Glass Company, Limited, Ube, Japan

[21] Appl. No.: 55,019

[22] Filed: May 28, 1987

[30] Foreign Application Priority Data

May 29, 1986 [JP] Japan ................... 61-122207

[51] Int. Cl.$^4$ ................... G02F 1/17; G02F 1/01
[52] U.S. Cl. ................... 350/357
[58] Field of Search ............ 350/357, 355, 353; 340/785

[56] References Cited

U.S. PATENT DOCUMENTS

| 4,217,579 | 8/1980 | Hamada et al. | 350/357 |
| 4,448,493 | 5/1984 | Matsudaira et al. | 350/357 |
| 4,505,021 | 3/1985 | Hamada et al. | 350/357 |
| 4,521,081 | 6/1985 | Miyake et al. | 350/357 |
| 4,660,939 | 4/1987 | Tsuchiya et al. | 350/357 |
| 4,699,471 | 10/1987 | Miyake et al. | 350/357 |

FOREIGN PATENT DOCUMENTS

| 0046828 | 4/1977 | Japan | 350/357 |
| 0007958 | 1/1979 | Japan | 350/357 |
| 58-30731 | 2/1983 | Japan | |

Primary Examiner—Eugene R. LaRoche
Assistant Examiner—Nathan W. McCutcheon
Attorney, Agent, or Firm—Fleit, Jacobson, Cohn, Price, Holman & Stern

[57] ABSTRACT

The invention relates to an electrochromic (EC) display device which comprises a display electrode made up of a transparent conductive layer and a patterned EC layer, a counter electrode having an EC layer laid on a conductive layer and an electrolyte which occupies the space between the two electrodes, and in which the display electrode employs a first type EC material that takes on color in its electrochemically oxidized state, such as Prussian blue, and the counter electrode a second type EC material that takes on color in its reduced state, such as $WO_3$, or vice versa. The EC layer of the counter electrode is not patterned, and the patterned EC layer of the display electrode is made smaller in surface area than the EC layer of the counter electrode and an upper limit of the surface area ratio of the former EC layer to the latter EC layer is specified. When this EC display device is driven in the usual manner coloration of the patterned EC layer takes place without perceptible coloration of the EC layer of the counter electrode.

7 Claims, 3 Drawing Sheets

ELECTROCHROMIC DISPLAY DEVICE

BACKGROUND OF THE INVENTION

This invention relates to an electrochromic display device which utilizes a combination of two types of electrochromic materials one of which takes on color in its electrochemically oxidized state while the other takes on color in its electrochemically reduced state.

There are several types of electrochromic (EC) display devices for displaying letters and/or figures. In EC display devices of a relatively simple construction, only the display electrode comprises a suitably patterned film of an EC material such as Prussian blue or tungsten trioxide, whereas the counter electrode on the opposite side is a simple and uniformly formed transparent conductive film on a glass substrate. However, this type of EC display devices does not possess sufficient endurance to repeated drive because the EC film is easily deteriorated mainly by the influence of decomposition reaction of water contained in the electrolyte liquid which intervenes between the display and counter electrodes.

In another type of EC display device as shown in JP-A No. 58-30731 for instance, one of the display electrode and the oppositely arranged counter electrode comprises a first type of EC film which takes on color in its electrochemically oxidized state and the other comprises a second type of EC film which takes on color in its reduced state. A typical example of the first type EC materials is Prussian blue which assumes blue color by oxidation, and a typical example of the second type EC materials is WO$_3$ which assumes blue color by reduction. In this type of EC display device the EC films on the two electrodes are formed in the same display pattern. In operation, electrochemical oxidation of the display electrode is accompanied by electrochemical reduction of the opposite electrode, and vice versa. Accordingly simultaneous coloration and simultaneous bleaching of the two electrodes take place. However, conventional EC display devices of this type have disadvantages in several respects. First, not only the EC film on the display electrode but also the EC film on the counter electrode need to be formed by using a precise and troublesome patterning technique. Furthermore, in assembling the front and back substrates respectively provided with the display electrode and the counter electrode into a display device cell it is necessary to set the patterned EC film of the display electrode very accurately opposite to the identically patterned EC film of the counter electrode. These requirements offer difficulties in improving productivity and reducing production cost. Besides, in practical use of the EC display device the pattern of the letters or figures is seen as double image depending on the angle of sight since both of spaced two EC patterns exhibit color.

SUMMARY OF THE INVENTION

It is an object of the present invention to provide an electrochromic display device which utilizes the aforementioned two types of EC materials in the display electrode and the counter electrode, respectively, and which is durable to long repeated drive and can display a colored image of letters and/or figures with high resolution and, furthermore, which can be produced by eased patterning and assembling operations.

According to the invention, in an EC display device of the above stated type the EC layer of the display electrode is made smaller in surface area than the EC layer of the counter electrode, and an upper limit of the surface area ratio of the former EC layer to the latter EC layer is specified. This is based on our discovery that when said surface area ratio is rendered lower than a certain level and the EC display device is operated in the usual manner, only the EC layer of the display electrode takes on color without being accompanied by perceptible coloration of the EC layer of the counter electrode.

More definitely, an EC display device according to the invention comprises a display electrode made up of a transparent conductive layer and an electrochromic layer which is laid on the conductive layer in a desired pattern and which is formed of a selected one of a first type electrochromic material that takes on color in its electrochemically oxidized state and a second type electrochromic material that takes on color in its electrochemically reduced state, a counter electrode which is arranged opposite to and spaced from the display electrode and has an electrochromic layer which is laid on a conductive layer and is formed of the other of the aforementioned two types of electrochromic materials, and an electrolyte liquid which occupies the space between the displayelectrode and the counter electrode. In this EC display device the surface area of the EC layer of the counter electrode is at least S times as large as the surface area of the EC layer of the display electrode, the value of the coefficient S being given by equation $S = 3Q/4 - 3/2$, wherein Q is the amount of charge injected into the display electrode, in mC/cm$^2$, when the EC display device is driven for coloration of the display electrode.

Usually the value of the surface area ratio S is not smaller than 2.25.

The patterned EC layer of the display electrode may be comprised of either a single segment or a plurality of segments which are in a certain pattern as a whole or each of which is in the pattern of a certain letter or figure.

An EC display device according to the invention is particularly suitable for displaying letter(s) and/or figure(s). In producing this EC display device, patterning for the display purpose is made only on the display electrode. The EC layer of the counter electrode is a simple coating layer which occupies nearly the entire area of the electrode. Therefore, the cost of production can considerably be reduced. Furthermore, the colored image displayed on this device is never seen double irrespective of the angle of sight.

In an EC display device according to the invention, the display electrode may optionally comprise a supplementary EC layer which is laid on the aforementioned transparent conductive layer and is spaced from the aforementioned patterned EC layer. The supplementary EC layer is used either as a background or as a second display element as will later be described in detail.

Examples of the first type EC materials usable in this invention are Prussian blue, iridium oxide, NiOOH, Cu$_2$O and polytriphenylamine. Examples of the second type EC materials are WO$_3$, Nb$_2$O$_3$, MoO$_3$, V$_2$O$_5$ and TiO$_2$.

DESCRIPTION OF THE PREFERRED EMBODIMENTS

Figure 1:
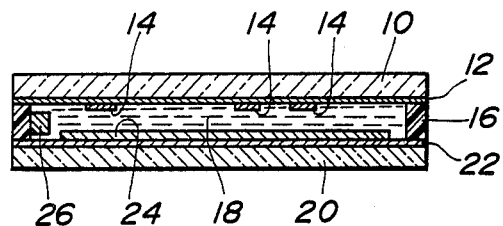
FIG. 1 is a schematic and sectional illustration of a transmissive type EC display device as an embodiment of the invention.

FIG. 1 shows a general construction of a transmissive type EC display device embodying the present invention. The display device has oppositely arranged front and back substrates 10 and 20 both of which are transparent and usually made of glass. A transparent conductive film 12 is deposited on the inner surface of the front substrate 10, and, as a display electrode, a first EC layer 14 is formed on the conductive film 12. This display electrode 14 is formed of a first type EC material which assumes a characteristic color in an electrochemically oxidized state. The inner surface of the back substrate 20 is coated with a conductive film 22, and, as a counter electrode, a second EC layer 24 is formed on the conductive film 22. The counter electrode 24 is formed of a second type EC material which assumes a characteristic color in an electrochemically reduced state. Alternatively, the display electrode 14 may be formed of the second type EC material and the counter electrode 24 the first type EC material. The two substrates 10 and 20 are held spaced from each other by a thin layer 16 of a sealing material, which is applied peripherally of the substrates 10, 20 so as to surround the EC layers 14, 24. An auxiliary electrode 26 for use in an initial reduction treatment described hereinafter is disposed in a side marginal region of the space defined between the two opposite substrates 10 and 20. The remaining space in the EC display device cell is filled with an electrolyte liquid 18.

Figure 2:
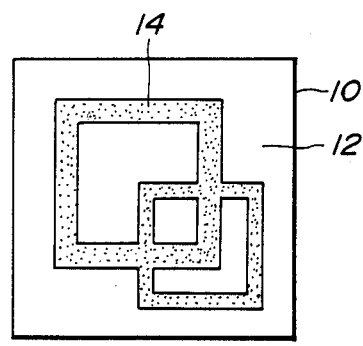
FIG. 2 is a plan view of a display electrode in the display device of FIG. 1 and shows an example of various patterns of the display electrode.

In the EC display device of FIG. 1, the first EC layer 14 as the display electrode is formed in a desired pattern as shown, for example, in FIG. 2 to indicate a letter or letters and/or a figure or figures. In contrast, the second EC layer 24 as the counter electrode is formed over almost the entire effective surface area of the underlying conductive film 22. According to the invention, as stated hereinbefore, the total surface area of the first EC layer 14 is made considerably smaller than the surface area of the second EC layer 24 such that the latter surface area is at least S times as large as the former surface area. (The coefficient S is as defined hereinbefore.)

EXPERIMENT

Nine sample EC display devices of the type shown in FIG. 1 were produced identically except the surface area of the first EC layer 14 of the display electrode.

The transparent substrates 10 and 20 were 100 mm × 100 mm glass plates, and the transparent conductive films 12 and 22 were formed by vacuum deposition of $SnO_2$. As the EC layer 24 of the counter electrode a film of $WO_3$ was formed to a thickness of 4000 Å so as to have a surface area of 5500 mm².

As the EC layer 14 of the display electrode a film of Prussian blue represented by the formula $Fe_4^{III}[Fe^{II}CN)_6]_3$ was formed by an electrodeposition method to a thickness of 4000 Å. In every sample the Prussian blue film 14 was in a square pattern, but its surface area in comparison with the surface area of the $WO_3$ film 24 was different from sample to sample. That is, in the nine samples the surface areas of the Prussian blue film 14 were 1/2.5 (2200 mm²), 1/3 (1830 mm²), 1/4 (1370 mm²), 1/5 (1100 mm²), 1/6 (920 mm²), 1/8 (690 mm²), 1/10 (550 mm²), 1/12 (460 mm²) and 1/15 (370 mm²) of the surface area of the $WO_3$ film 24, respectively.

The front substrate 10 provided with the display electrode 14 and the back substrate 20 provided with the counter electrode 24 were arranged opposite and parallel to each other, and the peripheral seal layer 16 was formed by using butyl rubber and Thiokol rubber so as to keep a distance of 1 mm between the two substrates 10 and 20. The auxiliary electrode 26, which had an insulating covering (not shown) and was in the form of a strip 11 mm in width and nearly 1 mm in thickness, was fixedly disposed in a side marginal region of the EC display device cell so as not to intervene between the Prussian blue film 14 and the $WO_3$ film 24. As the electrolyte liquid 18, 1 mol/liter solution of $LiClO_4$ in propylene carbonate was introduced into the space in the display device cell by an inlet opening in the seal layer 16, and thereafter the opening was sealed up.

In the thus produced sample EC display devices the Prussian blue film 14 was in an oxidized state and accordingly assumed blue color. The $WO_3$ film 24 too was in an oxidized state and accordingly remained colorless. Therefore, there is the need of electrochemically reducing either the Prussian blue film 14 or the $WO_3$ film 24 for accomplishment of coloration or bleaching of the both electrodes 14 and 24 in advance of actual operation of the EC display device. The auxiliary electrode 26 is included for use in such an initial reduction treatment. Initially the Prussian blue film 14 was at a natural potential of +0.3 V with respect to the auxiliary electrode 26. To accomplish initial erduction and resultant bleaching of the Prussian blue film 14, a reverse voltage was applied across the auxiliary electrode 26 and the display electrode 14 so as to gradually lower the potential of the display electrode at a rate of 30–50 mV/min. In about 30 min the Prussian blue film 14 turned colorless and transparent.

After the initial reduction treatment, the nine sample display devices different in the surface area of the display electrode 14 were each tested by causing a constant DC current of 1 mA to flow from the display electrode to the counter electrode and measuring the amount of charge injected into the display electrode and the light transmittance of the counter electrode 24 at predetermined constant time intervals. During the testing, coloration of the $WO_3$ film 24 of the counter electrode was very slow and weak particularly in samples in which the surface area of the Prussian blue film 14 was very small. Each measurement of the transmittance of the weakly colored counter electrode 24 was converted into the amount of difference of the measured transmittance from the transmittance of the same electrode in the fully bleached state.

Figure 3:
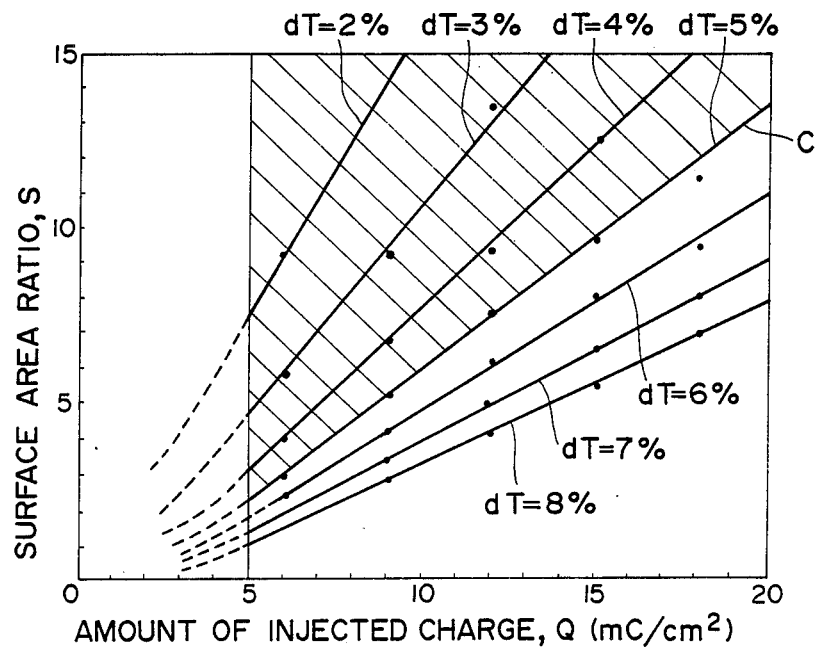
FIG. 3 is a chart showing, as the result of an experiment on samples of an EC display device of the type shown in FIG. 1, relation between the amount of charge injected into the display electrode and the surface area ratio of the EC layer of the counter electrode to the EC layer of the display electrode, plotted for light transmittance of the counter electrode in percentage of the value in the fully bleached state as parameter.

The chart of FIG. 3 was prepared from the result of the above described experiment. On the face of it, the chart shows relation between the amount of charge injected into the display electrode, Q, in $mC/cm^2$ and the surface area ratio of the $WO_3$ film 24 of the counter electrode to the Prussian blue film 14 of the display electrode, plotted for light transmittance of the counter electrode, dT, as parameter. The transmittance level dT of each curve is indicated in percentage of the transmittance of the fully bleached counter electrode. In another aspect the chart shows the dependence of the degree of coloration of the counter electrode with a given amount of charge injected into the display electrode on the surface area ratio S. Even though a slight change coccurs in the color of an EC electrode layer, such a change is not perceptible by human eyes insofar as the difference in transmittance is not more than 5%. On the other hand, sufficient coloration of the display electrode takes place as the amount of injected charge reaches 5 $mC/cm^2$. In principle the amount of injected charge can be increased by thickening the EC film 14 of the display electrode. In practice, however, a limit is placed on the EC film thickness because indeliberate thickening of the EC film often results in nonuniformity of the film thickness and/or peel of the film. Injection of charge of more than 20 $mC/cm^2$ into an EC film of a practicable thickness might damage the EC film and, hence, is undesirable.

In view of such matters, attention is devoted to the curve C in FIG. 3 which represents conditions where the difference in transmittance of the $WO_3$ counter electrode is constantly 5%. While the amount of charge injected into the display electrode, Q, is in the range from 5 to 20 $mC/cm^2$ the curve C can be regarded as linear. In respect of relation between Q and the surface area ratio of the $WO_3$ counter elelctrode 24 to the Prussian blue display electrode 14, an empirical equation $S = 3Q/4 - 3/2$ is derived from the curve C. When the surface area of the EC film 24 of the counter electrode is at least S ($3Q/4 - 3/2$) times as large as the surface area of the EC film 14 of the display electrode, viz. in the hatched region of the chart of FIG. 3, the EC display device satisfies the aforementioned conditions as to the transmittance difference dT and the amount of injected charge Q.

In driving the EC display device for coloration of the display electrode, a DC voltage (e.g. 0.5 V) is applied across the display electrode and the counter electrode to cause a current to flow from the display electrode to the counter electrode. Accordingly the charge stored in the display electrode is discharged as cations and electrons into the electrolyte liquid, whereby corresponding amounts of cations and electrons are injected into the counter electrode. Since the display electrode is relatively small in the surface area of the EC layer the amount of released charge per unit area of the EC layer becomes fairly large, so that sufficient coloration of the display electrode takes place. On the other hand, in the counter electrode which is relatively large in the surface area of the EC layer the amount of injected charge per unit area of the EC layer becomes very small, so that coloration of the counter electrode hardly takes place.

EXAMPLE 1

A transmissive type EC display device of the construction shown in FIG. 1 was produced in the same manner as in the above described Experiment except the particulars of the Prussian blue film 14 of the display electrode.

In this example the Prussian blue film 14 was formed in the pattern shown in FIG. 2 by an electrodeposition method using a masking tape to cover the extra areas of the transparent conductive film 12. The Prussian blue film 14 was 4000 Å in thickness and 550 $mm^2$ in total surface area. The $WO_3$ film 24 of the counter electrode was 4000 Å in thickness and 5500 $mm^2$ in surface area. That is, the surface area ratio S was 10. The auxiliary electrode 26 was prepared by the steps of kneading a mixture of polytriphenylamine powder, carbon powder and polytetrafluoroethylene dispersion powder, press-shaping the kneaded mixture into a sheet and press-bonding two pieces of the obtained sheet to a meshwork (openings 40-50 mesh) of metallic titanium, which is an electrochemically inactive material, and covering the resultant electrode body with a porous insulator sheet. The auxiliary electrode 26 was in the shape of a strip 11 mm in width and nearly 1 mm in thickness. The distance between the two substrates 10 and 20 was 1 mm, and the electrolyte liquid 18 was 1 mol/liter solution of $LiClO_4$ in propylene carbonate.

Precedent to testing of this EC display device, the initial reduction treatment described in the foregoing Experiment was made to accomplish bleaching of the Prussian blue film 14. Then a DC voltage was applied across the Prussian blue display electrode 14 and the $WO_3$ counter electrode 24 so as to keep the display electrode at a potential of +0.5 V with respect to the counter electrode. In about 3 sec the pattern of the display electrode took on a clear blue color, while the counter electrode did not exhibit appreciable coloration. Next, a reverse DC voltage (−0.5 V) was applied across the display electrode and the counter electrode. In about 6 sec, complete and uniform bleaching took place, whereby the display device turned a transparent cell which exhibited visible light transmittance of 80%.

EXAMPLE 2

The EC display device of Example 1 was modified only in the pattern and total surface area of the Prussian blue display electrode 14.

Figure 4:
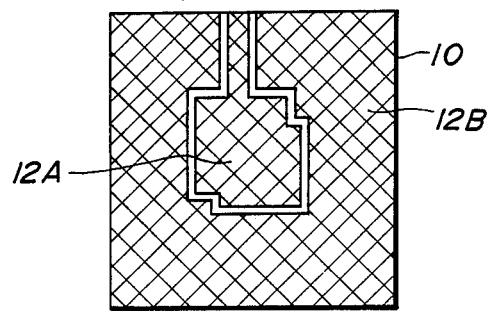
FIGS. 4 and 5 show, in plan views corresponding to FIG. 2, the manner of forming the display electrode in the EC display device of FIG. 1 in a split pattern.
Figure 5:
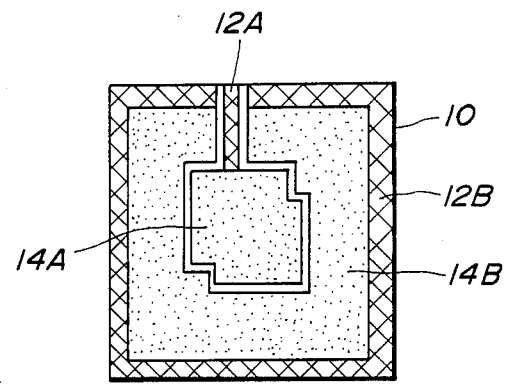

In this example, as shown in FIG. 4, the conductive film 12 on the front substrate 10 was formed in two separate segments 12A and 12B. Referring to FIG. 5, Prussian blue film was electrodeposited so as to form a display pattern 14A on he first segment 12A of the conductive film and a background segment 14B on the other segment 12B of the conductive film. The surface area of the display pattern 14A was about 1600 $mm^2$ and that of the background segment 14B was 3700 $mm^2$, so that the total surface area of the Prussian blue film was 5300 $mm^2$.

Initially both the display pattern 14A and the background segment 14B assumed blue color. The initial reduction treatment described hereinbefore was made to accomplish bleaching of both the display pattern 14A and the background segment 14B. After that a DC voltage was applied between the display pattern 14A of the Prussian blue electrode and the $WO_3$ counter electrode 24 so as to maintain the display pattern 14A at a potential of +0.5 V (vs counter electrode). In about 4 sec, only the display pattern 14A exhibited a clear blue color. Next, a reverse voltage (−0.5 V) was applied between the display pattern 14A and the counter electrode 24. In about 5 sec, complete and uniform bleaching took place so that the display device turned a transparent cell which exhibited visible light transmittance of 80%.

Next, while the EC display device was in the completely bleached state a DC voltage of +1.0 V was applied between the entirety of the Prussian blue display electrode (including both the display pattern 14A and the background segment 14B) and the counter electrode 24. In about 5 sec, blue coloration took place over the entire display area of the device, though in a strict sense the narrow gap between the display pattern 14A and the background segment 14B remained colorless. Then a DC voltage of −0.5 V was applied between the entirety of the display electrode and the counter electrode. In this case the display pattern 14A could not be identified since the background segment 14B too assumed the same blue color. However, the display device exhibited a very deep blue color since coloration of the $WO_3$ counter electrode 24 took place simultaneously with coloration of the display electrode. That is, the EC display device of Example 2 can be used in two different manners by selectively utilizing either only the display pattern 14A in the display electrode or the entirety of the display electrode including the "background segment" 14B. In about 4 sec complete and uniform bleaching took place so that the display device turned a transparent cell which exhibited visible light transmittance of 80%.

In this example the background segment 14B of the Prussian blue film had a square outer periphery nearly identical with the periphery of the square $WO_3$ film 24 of the counter electrode. As will readily be understood, also it is possible to form the "background segment" 14B in another shape different from both the display electrode and the counter electrode to thereby use the differently shaped segment as a second display pattern which can be colored and bleached independently of the first display pattern 14A. In such a case the two display patterns may be formed of two different kinds of EC materials, respectively, to produce an EC display device that exhibits a combination of two patterns different not only in shape but also in color. In the case of Example 2, the background segment 14B on the display electrode may be formed of an EC material which exhibits a color other than the blue color of Prussian blue.

The present invention can be applied to not only transmissive type EC display devices but also reflective type EC display devices. In conventional reflective type EC display devices it is necessary to dispose a reflection board, usually a white board, between the display electrode and the counter electrode since the counter electrode itself cannot be utilized as a reflection layer. The inclusion of the reflection board entails additional cost, and the material of this board is required to be compatible with the electrolyte liquid. In reflective type EC display devices according to the invention it suffices to provide a suitable reflection board on the outer side of the display device cell instead of disposing a reflection board in the electrolyte liquid.

What is claimed is:

1. An electrochromic display device comprising:
a display electrode comprising a transparent conductive layer, a first electrochromic layer laid on said transparent conductive layer in a desired pattern and a supplementary electrochromic layer laid on said transparent conductive layer and isolated from and arranged so as to surround said first electrochromic layer, said first electrochromic layer being formed of one of a first type electrochromic material that takes on color in its electrochemically oxidized state and a second type electrochromic material which takes on color in its electrochemically reduced state, and said supplementary electrochromic layer being formed of the same type of electrochromic material as said first electrochromic layer;
a counter electrode arranged opposite to and spaced from said display electrode and comprising a conductive layer and a second electrochromic layer laid on the conductive layer, said second electrochromic layer being formed of the other of said first and second types of electrochromic materials; and
an electrolyte which occupies the space between said display electrode and said counter electrode;
wherein the surface area of the second electrochromic layer of said counter electrode is at least S times as large as the surface area of the first electrochromic layer of said display electrode, the value of said S being given by the equation $S = 3Q/4 - 3/2$, wherein Q is the amount of charge injected into said display electrode, in $mC/cm^2$, when the display device is driven for coloration of said display electrode.

2. A display device according to claim 1, wherein the value of said Q is in the range from 5 to 20, in $mC/cm^2$.

3. A display device according to claim 1, wherein the first electrochromic layer of said display electrode consists of a single segment.

4. A display device according to claim 1, wherein the first electrochromic layer of said display electrode consists of a plurality of discontinuous segments, said surface area of the first electrochromic layer of said display electrode referring to the total surface area of said plurality of discontinuous segments.

5. A display device according to claim 1, wherein said first type electrochromic material is selected from the group consisting of Prussian blue, iridium oxide, NiOOH, $Cu_2O$ and polytriphenylamine.

6. A display device according to claim 5, wherein said second type electrochromic material is selected from the group consisting of $WO_3$, $Nb_2O_3$, $MoO_3$, $V_2O_5$ and $TiO_2$.

7. An electrochromic display device comprising:
a display electrode comprising a transparent conductive layer, a first electrochromic layer laid on said transparent conductive layer in a desired pattern and a supplementary electrochromic layer laid on said transparent conductive layer and isolated from and arranged so as to surround said first electrochromic layer, said first electrochromic layer being formed of one of a first type electrochromic material that takes on color in its electrochemically oxidized state and a second type electrochromic material that takes on color in its electrochemically reduced state, and said supplementary electrochromic layer being formed of the same type of electrochromic material as said first electrochromic layer;
a counter electrode arranged opposite to and spaced from said display electrode and comprising a conductive layer and a second electrochromic layer laid on the conductive layer, said second electrochromic layer being formed of the other of said first and second types of electrochromic materials; and an electrolyte liquid which occupies the space between said display electrode and said counter electrode;

wherein the ratio of the surface area of the first electrochromic layer of said display electrode to the surface area of the second electrochromic layer of said counter electrode is not greater than 1/2.25.

* * * * *